US006343055B1

United States Patent
Ema et al.

(10) Patent No.: US 6,343,055 B1
(45) Date of Patent: Jan. 29, 2002

(54) APPARATUS FOR AND METHOD OF REPRODUCING MUSIC TOGETHER WITH INFORMATION REPRESENTING BEAT OF MUSIC

(75) Inventors: Shozo Ema; Hidehiro Ishii, both of Tokorozawa; Takao Sawabe; Yoshinori Hasegawa, both of Tokyo-to; Kaoru Yamamoto, Tsurugashima; Hirokazu Inotani, Tokorozawa; Tokihiro Takahashi, Kawagoe; Yoichi Yamada, Tokorozawa, all of (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/271,990

(22) Filed: Mar. 19, 1999

(30) Foreign Application Priority Data

Mar. 20, 1998 (JP) .......................................... 10-072794

(51) Int. Cl.⁷ ................................................ G11B 7/00
(52) U.S. Cl. ................................ 369/53.16; 369/53.34; 369/275.3
(58) Field of Search ................................ 369/47.1, 47.2, 369/47.21, 47.22, 47.27, 59.23; 84/609, 611, 612, 635, 636

(56) References Cited

U.S. PATENT DOCUMENTS

| 4,566,362 | A | | 1/1986 | Kikumoto |
| 4,594,930 | A | | 6/1986 | Murakami |
| 4,694,724 | A | | 9/1987 | Kikumoto et al. |
| 5,256,832 | A | 10/1993 | Miyake |
| 5,313,011 | A | 5/1994 | Koguchi |
| 5,574,243 | A | * | 11/1996 | Makai et al. ................. 84/609 |
| 5,614,687 | A | * | 3/1997 | Yamada et al. .............. 84/662 |
| 6,031,175 | A | * | 2/1999 | Tozuka ......................... 84/610 |
| 6,137,047 | A | * | 3/1999 | Sugiyama ..................... 84/626 |
| 6,093,880 | A | * | 7/2000 | Arnalds ......................... 84/600 |
| 6,175,632 | B1 | * | 1/2001 | Marx ............................ 381/56 |

FOREIGN PATENT DOCUMENTS

JP 10-319979 * 12/1998 ................. 369/32

* cited by examiner

Primary Examiner—Nabil Hindi
(74) Attorney, Agent, or Firm—Morgan, Lewis & Bockius LLP

(57) ABSTRACT

A music reproducing apparatus is provided. The apparatus reproduces music on the basis of music data which includes music information representing music to be reproduced and beat information representing a beat of the music and which is recorded on a recording medium. The music information is divided into a plurality of music information pieces whose time length are equal to each other. The beat information is divided into a plurality of beat information pieces. Each of the beat information pieces includes information for designating one of the music information pieces in which the beat of the music is present. The apparatus includes: a reading device that reads the music data from the recording medium; a reproduction device that extracts the music information pieces from the read music data, and that reproduces the music on the basis of the extracted music information pieces; and a beat signal output device that extracts one of the beat information pieces from the read music data, and that designates one of the music information pieces in which the beat of music is present, and that outputs a beat signal representing the beat of the music at the same time that the designated one of the music information pieces is reproduced by the reproduction device.

26 Claims, 9 Drawing Sheets

APPARATUS FOR AND METHOD OF REPRODUCING MUSIC TOGETHER WITH INFORMATION REPRESENTING BEAT OF MUSIC

BACKGROUND OF THE INVENTION

1. Field of the Invention

The present invention relates to an apparatus for and a method of reproducing audio information suitable for reproduction of, for example, music recorded on DVD, and more particularly relates to an apparatus for and a method of reproducing audio information, which can output information, such as tempo, beat or the like, recorded on DVD.

2. Description of the Related Art

For example, a disk jockey (DJ) uses two or more record players (turn tables) to then carry out continuous reproduction or remix of music at a disco or a club. The DJ sets two records (conventional analog records) in the record players, respectively, and performs the reproduction while manually operating a rotation number of each record, a timing of a rotation start and the like, and further adjusting a beat of music recorded on each record. Hereafter, such a reproduction is referred to as "remix/continuous play".

Recently, the remix/continuous play has been realized by a CD or a CD reproducing apparatus. However, music is recorded on the CD as digital data, and the CD is rotated at a high speed when reproduced. Thus, in the case of the CD, differently from the analog record, it is difficult to manually operate the rotation number of the record and the timing of the rotation start. So, the remix/continuous play using the CD and the CD reproducing apparatus is performed as follows.

That is, the beat of the music is recognized from information with regard to the music itself recorded on the CD, and then a beat signal is generated in accordance with the beat. Moreover, two CD reproducing apparatuses are made synchronous with each other in accordance with this beat signal. If the music recorded on the CD has a certain rhythm and preferably includes percussion or drum sounds such as disco music or the like, a portion in which a reproduction level (volume) of the music is higher than those of the other portions can be detected as a beat (beat per measure) to thereby generate the beat signal in accordance with the detected beat. Then, the remix/continuous play can be done by making the two CD reproducing apparatuses synchronous with each other in accordance with this beat signal.

However, the method of detecting the beat per measure in accordance with the reproduction level of the music recorded on the CD has problems that it requires a complex detecting circuit and that it is difficult to detect the beat for the music in which the rhythm is not clear.

SUMMARY OF THE INVENTION

It is therefore an object of the present invention to provide an apparatus for and a method of reproducing audio information which can easily generate a beat, a tempo or the like of a music to be reproduced.

The above-mentioned object can be achieved by a first music reproducing apparatus in accordance with the present invention. The first music reproducing apparatus is an apparatus for reproducing music on the basis of music data which includes music information representing music to be reproduced and beat information representing a beat of the music and which is recorded on a recording medium. The apparatus includes: a reading device that reads the music data from the recording medium; a reproduction device that reproduces the music on the basis of the music information included in the read music data; and a beat signal output device that outputs a beat signal representing the beat of the music on the basis of the beat information included in the read music data.

In this music reproducing apparatus, the music data is read from the recording medium, and the music is reproduced on the basis of the music information included In the read music data. While the music is reproduced, the beat signal representing the beat of the reproduced music is output. Therefore, the beat of the music can be output, while the music is being reproduced.

In the first reproducing apparatus, beat strength information representing a strength of the beat of the music may be included in the music data. In this case, the first music reproducing apparatus further includes a beat strength signal output device that outputs a beat strength signal representing the strength of the beat of the music on the basis of the beat strength information included in the read music data. Accordingly, the strength of each beat can be output when the music is reproduced, or while the music is being reproduce.

In the first reproducing apparatus, tempo information representing a tempo of the music may be included in the music data. In this case, the first music reproducing apparatus further includes a tempo signal output device that outputs a tempo signal representing the tempo of the music on the basis of the tempo information included in the read music data. Accordingly, the tempo of the music can be output when the music is reproduced, or while the music is being reproduced.

The above-mentioned object can be also achieved by a second music reproducing apparatus in accordance with the present invention. The second music reproducing apparatus is an apparatus for reproducing music on the basis of music data which includes music information representing music to be reproduced and beat information representing a beat of the music and which is recorded on a recording medium. The music information is divided into a plurality of music information pieces whose time lengths are equal to each other, and the beat information is divided into a plurality of beat information pieces. Each of the beat information pieces includes information for designating one of the music information pieces in which the beat of the music is present. The second music reproducing apparatus includes: a reading device that reads the music data from the recording medium; a reproduction device that extracts the music information pieces from the read music data, and that reproduces the music on the basis of the extracted music information pieces; and a beat signal output device that extracts one of the beat information pieces from the read music data, and that designates one of the music information pieces in which the beat of music is present, and that outputs a beat signal representing the beat of the music at the same time that the designated one of the music information pieces is reproduced by the reproduction device.

In this music reproducing apparatus, the music data is read from the recording medium. Next, the music information pieces are extracted from the read music data. Next, the music is reproduced on the basis of the extracted music information pieces. While the music is being reproduced, the beat information pieces are extracted from the read music data, and one of the music information pieces in which the beat of the music is present is designated on the basis of the extracted beat information piece. Next, the beat signal representing the beat of the music is output at the same time that the designated music information piece is reproduced. Therefore, the reproduction of the music information piece in which the beat of the music is present and the output of the beat signal are simultaneously done. That is, the reproduction of the music information piece in which the beat of the music is present and the output of the beat signal are synchronized with each other.

In the second music reproducing apparatus, the beat signal output device may includes: an extraction device that extracts one of the beat information pieces from the read music data; a designation device that designates one of the music information pieces in which the beat of the music is present, on the basis of the extracted one of the beat information pieces; a calculation device that calculates a time that the designated one of the music information pieces is reproduced; a counting device that counts a time while the music is reproduced; and an output device that outputs the beat signal when the time counted by the counting device coincides with the time calculated by the calculation device.

In this beat signal output device, one of the music information pieces in which the beat of the music is preset is designated on the basis of the extracted beat information piece. Next, the time that the designated music information piece is reproduced is calculated. On the other hand, the counting device counts the time while the music is being reproduced. When the time counted by the counting device coincides with the time calculated by the calculation device, the beat signal is output. Thus, the reproduction of the music information piece in which the beat of the music is present and the output of the beat signal are simultaneously done.

In the calculating device of the beat signal output device may includes: a time identifying device that identifies a time that a first music information piece, which is placed at a lead of a row of the music information pieces, is reproduced; a time length calculation device that calculates a time length between a location of the first music information piece and a location of the designated one of the music information pieces, in the row of the music information pieces, by using the time length of each of the music information pieces; and an output time calculation device that calculates an output time of the beat signal by using the time identified by the time identifying device, and the time length calculated by the time length calculation device.

The music information pieces are arrayed in a row in order of time of reproduction. In this case, in this calculating device, the time that a first music information piece is reproduced is firstly identified. The first music information piece means the music information piece placed at a lead of a row of the music information pieces. Next, in the row of the music information pieces, a time length between the location of the first music information piece and a location of the music information piece in which the beat of the music is present is calculated by using the time length of each music information piece. Next, the output time of the beat signal is calculated by using the time that the first music information piece is reproduced, and the time length between the first music information piece and the music information piece in which the beat of the music is present. Therefore, the output time of the beat signal can be easily calculated.

In the second music reproducing apparatus, beat strength information representing a strength of the beat of the music may be included in the music data. In this case, the second music reproducing apparatus further includes a beat strength signal output device that outputs a beat strength signal representing the strength of the beat of the music on the basis of the beat strength information included in the read music data.

In the second music reproducing apparatus, tempo information representing a tempo of the music may be included in the music data. In this case, the second music reproducing apparatus further includes a tempo signal output device that outputs a tempo signal representing the tempo of the music on the basis of the tempo information included in the read music data.

The above-mentioned object can be also achieved by a music reproducing method in accordance with the present invention. The music reproducing method is a method of reproducing music on the basis of music data which includes music information representing music to be reproduced and beat information representing a beat of the music and which is recorded on a recording medium. The music reproducing method comprising the processes of: reading the music data from the recording medium; reproducing the music on the basis of the music information included in the read music data; and outputting a beat signal representing the beat of the music on the basis of the beat information included in the read music data.

In this method, beat strength information representing a strength of the beat of the music may be includes the music data in this case, the method further includes a process of outputting a beat strength signal representing the strength of the beat of the music on the basis of the beat strength information included in the read music data.

Furthermore, in this method, tempo information representing a tempo of the music may be included in the music data. In this case, the method further includes a process of outputting a tempo signal representing the tempo of the music on the basis of the tempo information included in the read music data.

The above-mentioned object can be achieved by a storage medium readable by an apparatus for reproducing music. The storage medium having a data structure which enables the apparatus to reproduce the music. The data structure has: a first group that includes music information representing music to be reproduced; and a second group that includes beat information representing a beat of the music. The music information is divided into a plurality of music information pieces whose time lengths are equal to each other. The beat information is divided into a plurality of beat information pieces. Each of the beat information pieces includes information for designating one of the music information pieces in which the beat of the music is present. Such a storage medium enables a reproducing apparatus to generate a signal representing the beat of the music and to synchronize the output of this signal and the reproduction of the music.

In the storage medium, the music information pieces may be arrayed in a row in the first group, and one of the beat information pieces may represent a time length between a location of a lead of the row of the music information pieces and a location of one of the music information pieces in which the beat of the music is present, within the first group. Such a storage medium enables a reproducing apparatus to easily identify the location of the music information piece in which the beat of the music is preset and to easily identify the output time of the signal representing the beat of the music.

In the storage medium, the second group may include beat strength information representing a strength of the beat of the music. Accordingly, the storage medium enables a reproducing apparatus to generate a signal representing a strength of each beat of the music.

Furthermore, in the storage medium, the second group may include tempo information representing a tempo of the music. Accordingly, the storage medium enables a reproducing apparatus to generate a signal representing a tempo of the music.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

An embodiment of the present invention will be described below with reference to the accompanying drawings.

At first, DVD is exemplified as an audio information recording medium according to the present invention. A structure of audio information recorded on the audio information recording medium according to the present invention will be described below with reference to FIGS. 1 and 2.

(1) Physical and Logical Formats of Audio DVD (1.1) Physical Format

At first, a physical format (physical record format) of audio information on an audio DVD is described with reference to FIG. 1. As described below, the audio information includes information representing a music itself to be reproduced, information to manage the audio information, information to control the reproduction of the music, information to specify the music and the like.

Figure 1:
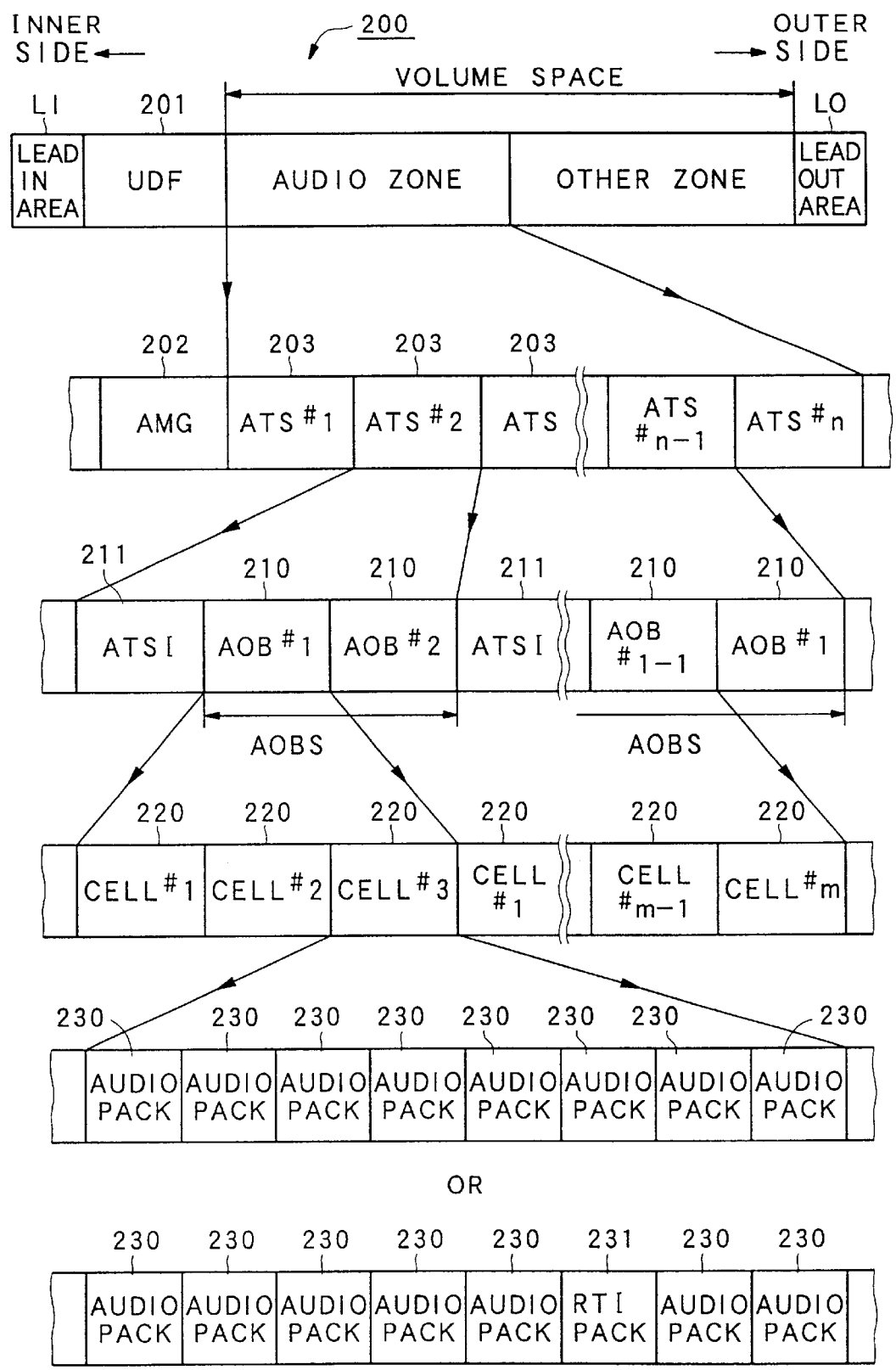
FIG. 1 is a view showing a physical record format of DVD according to an embodiment of the present invention.

As shown in FIG. 1, an audio DVD 200 in the embodiment has a lead-in area LI in the innermost side and a lead-out area LO in the outermost side. A volume space (main area) is located between the lead-in area LI and the lead-out area LO. An audio zone is recorded in this volume space. The audio information is recorded in this audio zone. The audio information is divided into a plurality of ATSs (Audio Title Sets) 203. An ID (Identification) number is assigned to each ATS (ATS #1 to ATS #n).

A UDF (Universal Disk Format) 201 having information to manage a format of a file recorded on the DVD 200 is recorded on the next outer side after the lead-in area LI, and an AMG (Audio Manager) 202 is recorded following the UDF 201. This AMG 202 is management information with regard to the whole of the audio information recorded on this audio DVD 200, and includes a menu of prompting a user to select an item, information to prevent an illegal copy, an access table to access each title, and the like.

Each ATS 203 is composed of an ATSI (Audio Title Set Information) 211 and a plurality of AOBs (Audio Objects) 210. The ATSI is positioned at a lead of each ATS 203, and an ID number is assigned to each AOB (Audio Object) 210.

Here, a portion composed of the plurality of AOBs 210 is referred to as an AOB set (AOBS). This AOB set is an actual body of the audio information.

Information, such as APGCI (Audio Program Chain Information) and the like, is recorded in the ATSI 211. The APGCI is the reproduction control information including information with regard to a program chain that is a logical division in which a plurality of cells are combined. The actual body of the audio information is recorded in each AOB 210. Each AOB 210 is composed of a plurality of cells 220 each having an ID number.

As for the cell 220, there are cells each composed of a plurality of audio packs 230, and cells 220 each composed of a plurality of audio packs 230 and a real time information pack 231 (hereafter, referred to as "RTI pack 231"). The audio pack 230 is a pack generated by dividing the audio information to be recorded on the audio DVD 200 for each predetermined size. The audio information included in each audio pack 230 is digital information, for example, such as linear PCM and the like.

Figure 2:
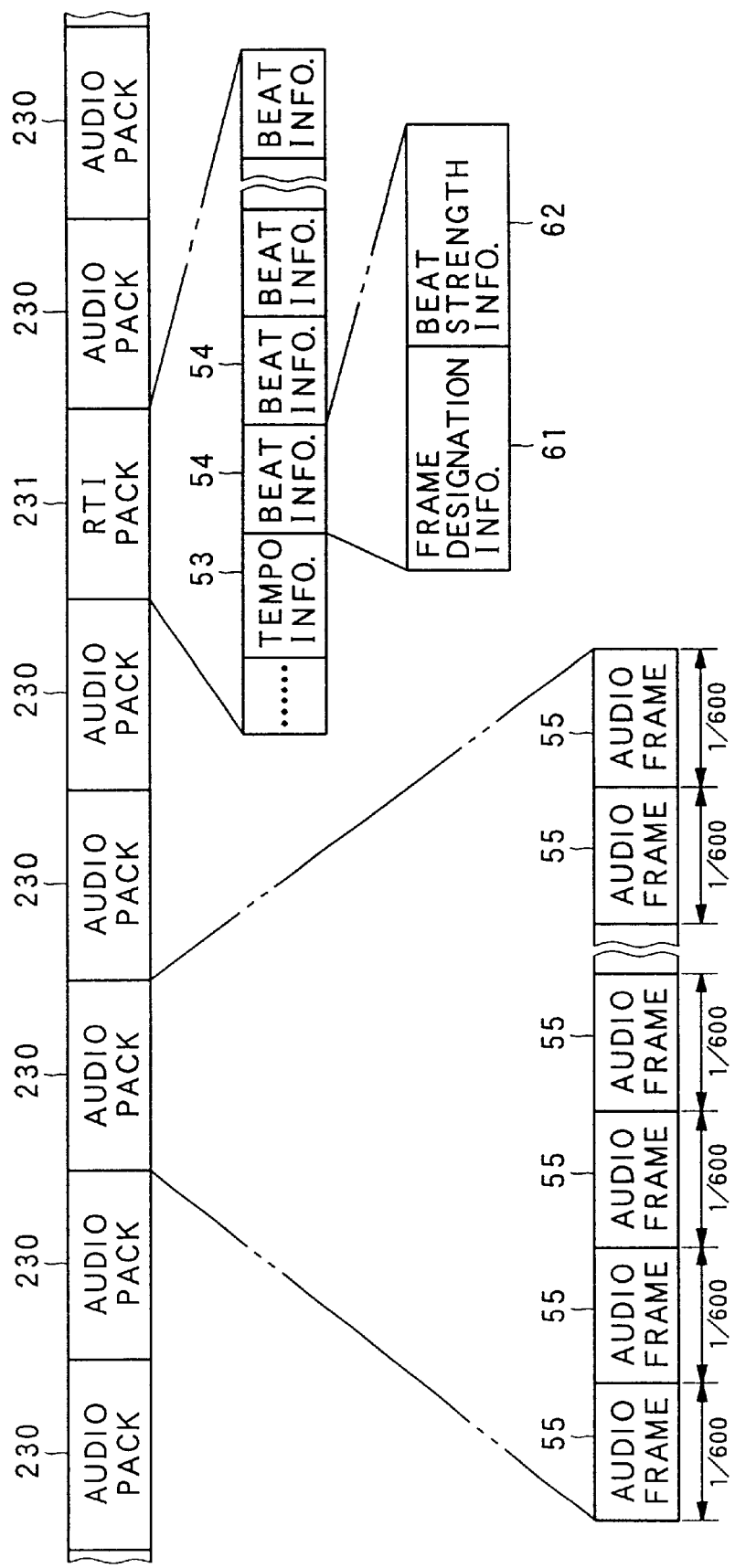
FIG. 2 is a view showing a physical record format of an RTI pack and an audio pack recorded on the DVD according to the embodiment of the present invention.

As shown in FIG. 2, the audio pack 230 is composed of a plurality of audio frames 55. An audio information piece in which the information representing the music itself to be reproduced is divided for each minimum time unit is recorded in each audio frame 55. For example, the audio information piece in which the music is divided at a unit of 1/600 seconds is recorded in each audio frame 55. That is, the audio frame 55 is an audio information piece whose reproduction time length is 1/600 seconds.

RTI data is included in the RTI pack 231. The RTI data is composed of text information such as a music name, an artist, words of a song and the like, a tempo information 53 (BPM Beat Per Minutes), beat information 54 and the like.

The tempo information 53 is information representing a tempo of a music. The tempo information 53 is a numeral representing the number of beats per minute (BPM:Beat per Minute) of the music to be reproduced.

Each beat information 54 is composed of a frame designation information 61 and a beat strength information 62. The frame designation information 61 is information to designate a position at which the beat of the music is located. Actually, an address of the audio frame 55 corresponding to a portion in which the beat of the music is present is recorded as the frame designation information 61.

In the concrete, the audio information piece in which the music is divided at the unit of 1/600 seconds is recorded in each audio frame 55, as mentioned above. Thus, the music is reproduced by sequentially reading the audio information pieces recorded in the audio frame 55 for each 1/600 seconds. Hence, for example, if the music to be reproduced has a constant beat, there are several or many audio frames 55 corresponding to the portion in which the beat of the music is present, among the plurality of audio frames 55 arrayed within the audio pack 230.

On the other hand, the respective audio frames 55 are arrayed in the audio pack 230 sequentially and continuously. Addresses are allocated to the respective audio frames 55. Thus, the designation of the address of each audio frame 55 enables any one of the audio frames 55 to be designated. Hence, if the address of the audio frame corresponding to the portion in which the beat of the music is present is recorded as the frame designation information 61, the audio frame 55 corresponding to the portion in which the beat is present can be designated by referring to the frame designation information 61, when the music is reproduced.

In addition, the address to be recorded as the frame designation information 61 may be an absolute or relative address of the DVD 200. Moreover, it may be a relative address representing a relative distance from the position of the RTI pack to the position in which the beat is present.

The beat strength information 62 is information representing the strength of the beat corresponding to the audio frame 55 designated by the frame designation information 61. For example, the beat strength information 62 is a numeral of one byte, and then designates the strength of the beat in the range of 0 to 255.

In addition, the tempo, the number of beats and the like may be recorded within the RTI pack as the text data.

Furthermore, the division, the array and the order of the actual audio information to be recorded on the DVD 200 can be freely defined in accordance with an intention of a producer who records the audio information. The audio information recorded in the above-mentioned physical format can be read out and reproduced in accordance with a logical format described below.

(1.2) Logical Format

The above-mentioned physical format is the actual record format of the audio DVD, while the logical format described below is a format which is constructed when the audio information is reproduced. In addition, the information with regard to the logical structure of the logical format is recorded in the AMG 202 and the ATSI 211.

Figure 3:
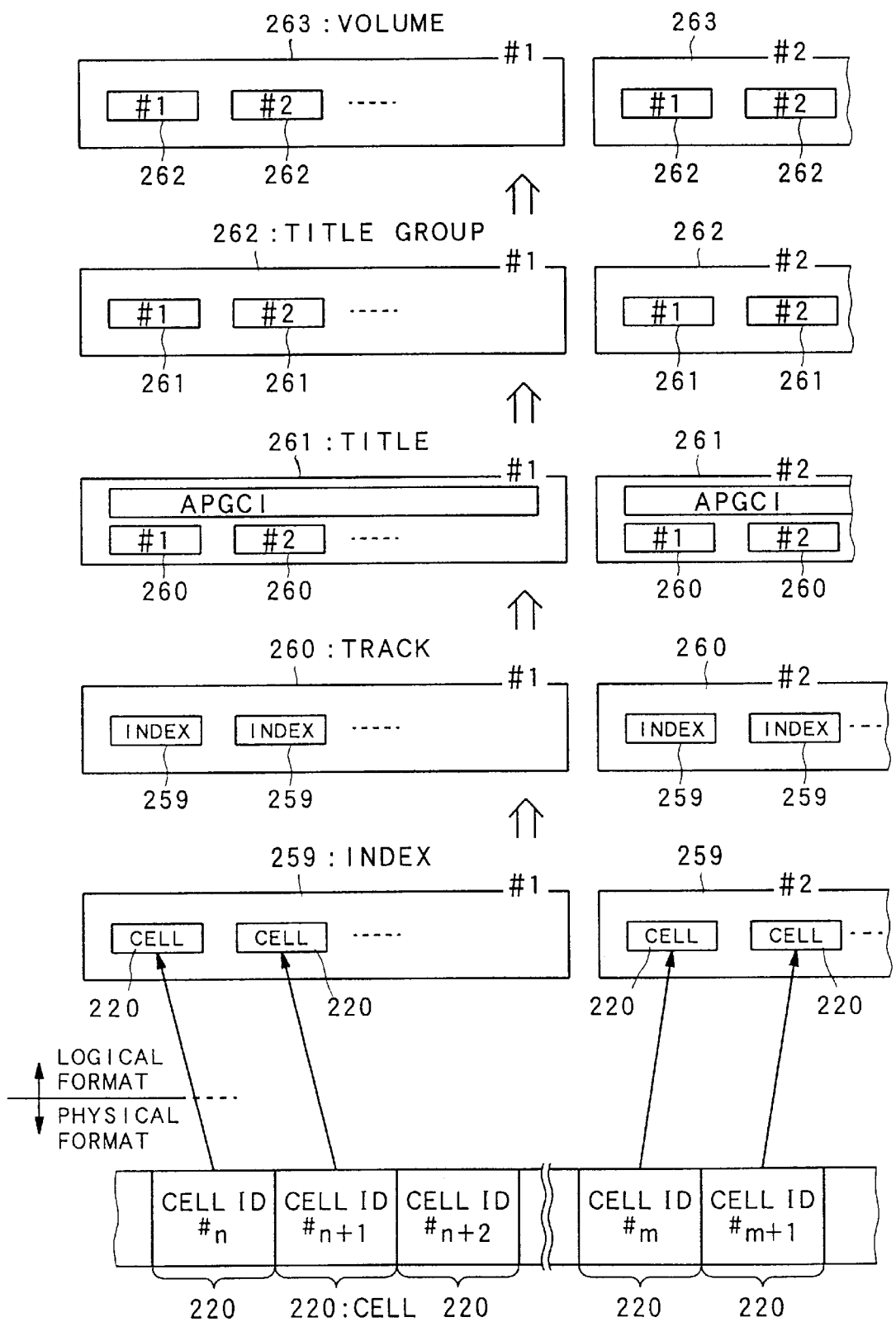
FIG. 3 is a view showing a logical format of data recorded on the DVD according to the embodiment of the present invention.

For explanatory convenience, the explanation is done from a lower hierarchy (a bottom side of FIG. 3) of the logical format. An index 259 is constituted by selecting and combining one cell or a plurality of cells 220. The index 259 is the minimum unit that can be accessed by a user.

In addition, the minimum unit of the information that can be established in accordance with the logical format is the cell, in this embodiment. Thus, the orders of the RTI packs and the audio packs arrayed in the cell can not be changed. That is, the order of the RTI packs and the audio packs are fixed.

A track 260 is logically composed of one or a plurality of indexes 259. This track 260 is an information unit corresponding to a piece of music. The user can select any track (music) to directly access the selected track.

A title 261 is logically constituted by combining one or a plurality of tracks 260. The above-mentioned APGCI is defined at a unit of this title 261. The APGCI includes the attribute of each track, the order of reproducing the cells 220, the address showing the record position on the audio DVD 200 of each cell 220, the number of a lead cell 220 to be reproduced in the single track 260, a method of reproducing each track 260 and various commands.

A title group 262 is logically composed of one or a plurality of titles 261. The title group 262 is a maximum unit that can be accessed by the user. A maximum of nine title groups can be defined in the single volume. Some or several titles 261 can be contained in a title group 262. The titles 261 contained in the title group 262 is sequentially reproduced. Titles 261 to be contained in a title group 262 may be decided depending on, for example, a singer, a composer or the like.

A volume 263 is logically composed of one or a plurality of title groups 262. This volume 263 is an information unit corresponding to a single album (DVD).

In this way, the album, the individual title and the individual music which can be actually recognized by the user are established in accordance with the logical format.

(2) DVD Reproducing Apparatus

An embodiment of a music reproducing apparatus of the present invention will be described. The music reproducing apparatus of the present invention is embodied in the DVD reproducing apparatus shown in FIG. 4.

(2.1) Configuration of DVD Reproducing Apparatus

Figure 4:
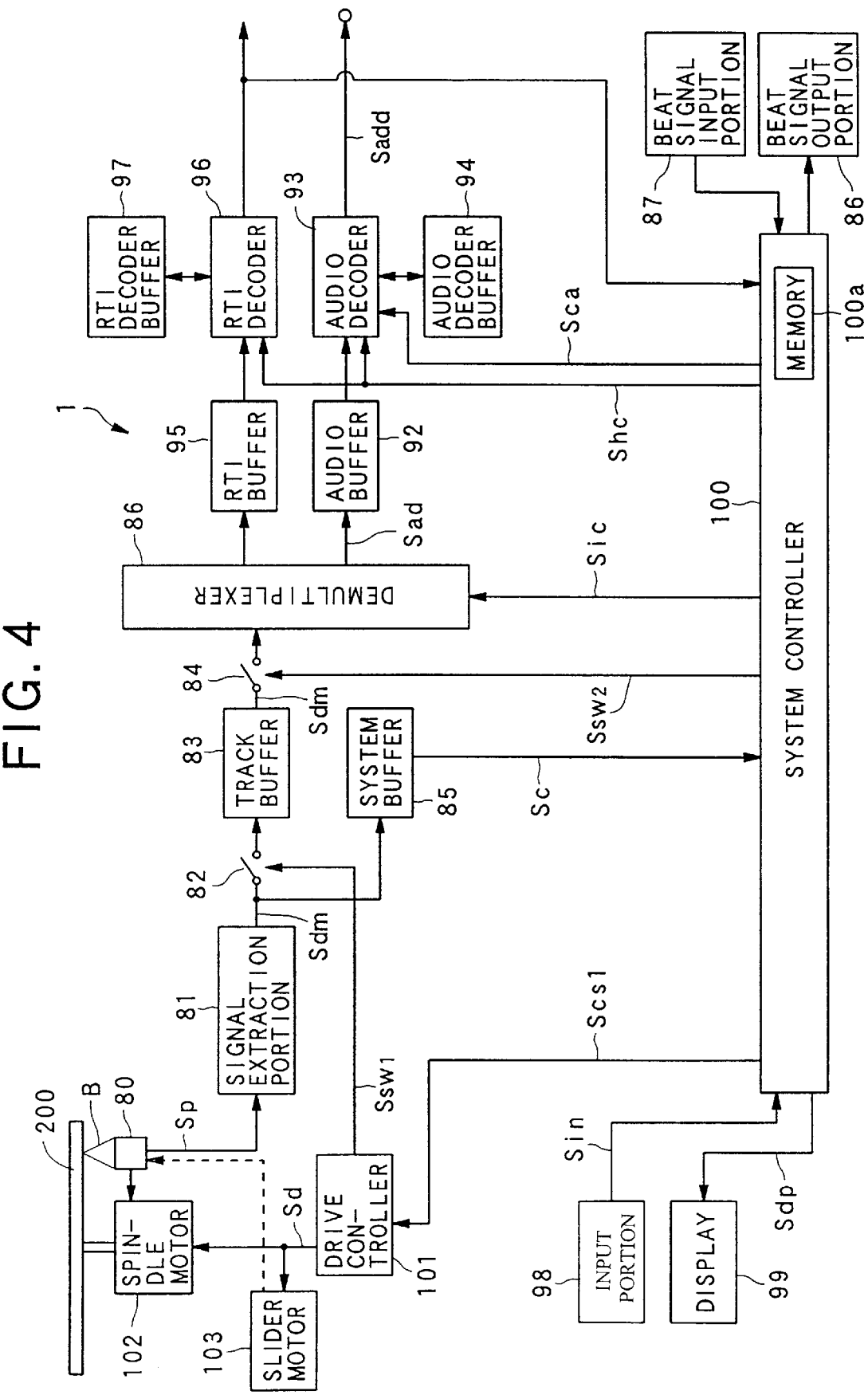
FIG. 4 is a block diagram showing a configuration of an audio DVD reproducing apparatus according to the embodiment of the present invention.

The audio DVD reproducing apparatus is an apparatus for reproducing the audio information recorded on the audio DVD 200. As shown in FIG. 4, the audio DVD reproducing apparatus 1 is provided with a pickup 80, a signal extraction portion 81, stream switches 82, 84, a track buffer 83, a system buffer 85, a demultiplexer 86, an audio buffer 92, an audio decoder 93, an audio decoder buffer 94, an RTI buffer 95, an RTI decoder 96, an RTI decoder buffer 97, an input portion 98, a display 99, a system controller 100, a drive controller 101, a spindle motor 102 and a slider motor 103. In addition, the configuration shown in FIG. 4 illustrates only the section with regard to the reproduction of sound, in the configuration of the audio DVD reproducing apparatus. A servo circuit for servo-controlling the pickup 80, the spindle motor 102 and the slider motor 103 and the like are similar to those of the conventional technique. Thus, the illustration and the detailed explanation thereof are omitted.

(2.2) Reproducing Operation

Operations of the audio DVD reproducing apparatus 1 will be described below.

The pickup 80 comprises a laser diode, a beam splitter, an objective lens, a light detector which are not shown, and the like. The pickup 80 radiates a light beam B to the audio DVD 200, and then receives a reflection light of the light beam B from the audio DVD 200. Accordingly, the pickup 80 converts the received light beam into a detection signal Sp, and outputs it. This detection signal Sp is a signal corresponding to information pits formed on the audio DVD 200. At this time, a radiation position and a focal point of the light beam B are controlled by a well known tracking servo control technique and focus control technique.

The detection signal Sp is sent from the pickup 80 to the signal extraction portion 81. The signal extraction portion 81 performs a demodulating process and an error correcting process on the detection signal Sp, and then generates a demodulation signal Sdm. The demodulation signal Sdm is sent to the stream switch 82 and the system buffer 85.

An opening and closing operation of the stream switch 82 is controlled by a switch signal Ssw1 from the drive controller 101. If the stream switch 82 is closed, the demodulation signal Sdm is sent to the track buffer 83. On the other hand, if the stream switch 82 is opened, the demodulation signal Sdm is not sent to the track buffer 83. Accordingly, this prevents unnecessary information from being sent to the track buffer 83.

The track buffer 83 is composed of FIFO (First In First Out) memories and the like, and transiently stores therein the demodulation signal Sdm. Then, the track buffer 83 continuously outputs the stored demodulation signal Sdm, if the stream switch 84 is closed.

In the stream switch 84, an opening and closing operation thereof is controlled by a switch signal Ssw2 from the system controller 100, in such a way that the various buffers at the later stages are not overflowed in a separating process in the demultiplexer 86 or the decoding process is not suspended since the various buffer become conversely empty.

On the other hand, the system buffer 85 to which the demodulation signal Sdm is input parallel to the track buffer 83 accumulates the management information (AMG 202 and the like) with regard to the whole information which is firstly decoded at the time of loading the audio DVD 200 and is recorded on the audio DVD 200 or the ATSI 211 for each ATS 203, and then outputs it to the system controller 100 as a control information Sc, and further outputs the control information Sc to the system controller 100.

The demultiplexer 86 extracts the audio information from the demodulation signal Sdm, and then outputs it to the audio buffer 92 as an audio signal Sad. At this time, the extraction of the audio information is carried out for each audio pack.

The audio buffer 92 is composed of FIFO memories and the like, and transiently accumulates therein the audio signal Sad, and outputs the accumulated audio signal Sad to the audio decoder 93. The audio signal Sad is input to the audio decoder 93. A reproducing process using the linear PCM manner and the like are performed on the input audio signal Sad, in accordance with a control signal Shc output by the system controller 100. Then, the signal generated as the result is output to a speaker (not shown) and the like, as a demodulation audio signal Sadd.

The RTI data (including the text information, the tempo information 53 and the beat information 54) included in the RTI pack 231 are output from the demultiplexer 86 to the RTI buffer 95. These data transiently accumulated in the RTI buffer 95 are output to the RTI decoder 96, in accordance with the control signal Shc output by the system controller 100, and further output from the RTI decoder 96 to the system controller 100. Then, these information are used for the generation of the beat signal, the process of displaying on the display 99 and the like.

Figure 5:
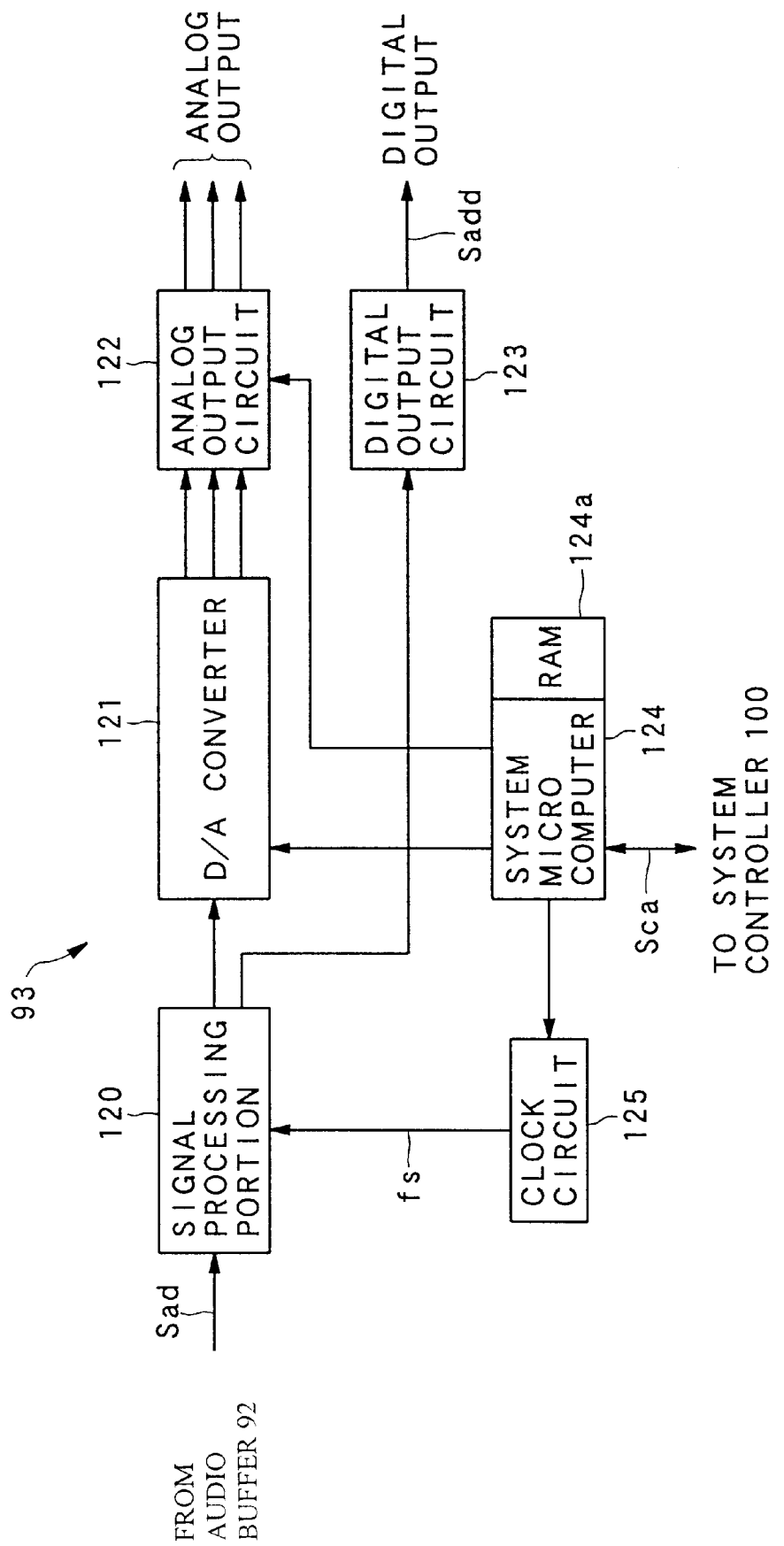
FIG. 5 is a block diagram showing a configuration of an audio decoder mounted in the audio DVD reproducing apparatus in the embodiment of the present invention.

FIG. 5 shows a configuration of the audio decoder 93. As shown in FIG. 5, the audio decoder 93 is provided with a signal processing portion 120, a D/A converter 121, an analog output circuit 122, a digital output circuit 123, a system micro computer 124 containing a RAM 124*a*, and a clock circuit 125.

The system micro computer 124 communicates with the system controller 100 through a control signal Sca, and controls the clock circuit 125, the signal processing portion 120, the D/A converter 121 and the analog output circuit 122. The system micro computer 124 has the RAM 124*a*. The RAM 124*a* transiently stores therein audio attribution information sent by the system controller 100 as the control signal Sca. The system controller 100 sends this audio attribution information to the signal processing portion 120, the D/A converter 121, the clock circuit 125 and the like, as the control signal.

The signal processing portion 120 uses a clock signal of generated by the clock circuit 125, and then carries out processes of decoding the audio signal sent from the audio buffer 92 and limiting a frequency band and the like, in accordance with the information of an encoding manner (the linear PCM, or Dolby AC3 or the like) obtained from the system micro computer 124, the sampling frequency, the number of quantizing bits and the like, and also carries out a de-emphasis process in accordance with Information of presence or absence of emphasis, and further outputs the processed audio signal to the D/A converter 121.

The D/A converter 121 divides the input signal for each channel, in accordance with channel information obtained from the system micro computer 124, and further outputs it to the analog output circuit 122 as an analog signal for each channel. The analog output circuit 122 performs a properly amplifying process on each signal of each channel, and then outputs it to the speaker (not shown) as an analog audio signal.

Then, the signal processing portion 120 outputs a digital audio signal Sadd through the digital output circuit 123 to external portion.

Operations at the time of reproducing the music will be described below. When a title group to be reproduced is specified, the system controller 100 obtains reproduction control information of tracks included in the specified title group from ATSI in ATS, by referring to the AMG 202. The obtained reproduction control information includes the audio attribute information and the address information of the tracks included in the title. The system controller 100 controls the audio decoder 93 in accordance with these information.

The system controller 100 sends a control signal ScsI to the drive controller 101 in accordance with the address information (start address) based on the reproduction control information, and instructs the pickup 80 to move to the start address. This process is carried out parallel to the control of the audio decoder 93.

After the pickup 80 is moved to the start address of the specified track, the system controller 100 instructs the pickup 80 to be transiently in a waiting state. Then, the system controller 100 starts the reproducing control after the completion of the setting of the audio attribute in the audio decoder 93. The reproduction of the music is carried out as mentioned above.

Referring back to FIG. 4, a beat signal generating program to generate a beat signal described later is stored in a memory 100*a* of the system controller 100. Then, the system controller 100 executes this beat signal generating program and generates the beat signal based on the beat information 54 and the like. The system controller 100 also has a function of receiving the beat signal input from the external source and adjusting a reproducing speed (the tempo of the music) in accordance with this beat signal.

A beat signal output portion 86 in FIG. 4 outputs the beat signal generated by the system controller 100 to the external portion. Also, a beat signal input portion 87 inputs to the system controller 100 the beat signal supplied from the external source.

(2.3) Beat Signal Generating Process

A beat signal generating process executed by the DVD reproducing apparatus 1 will be described below with reference to a flowchart in FIG. 6.

Figure 6:
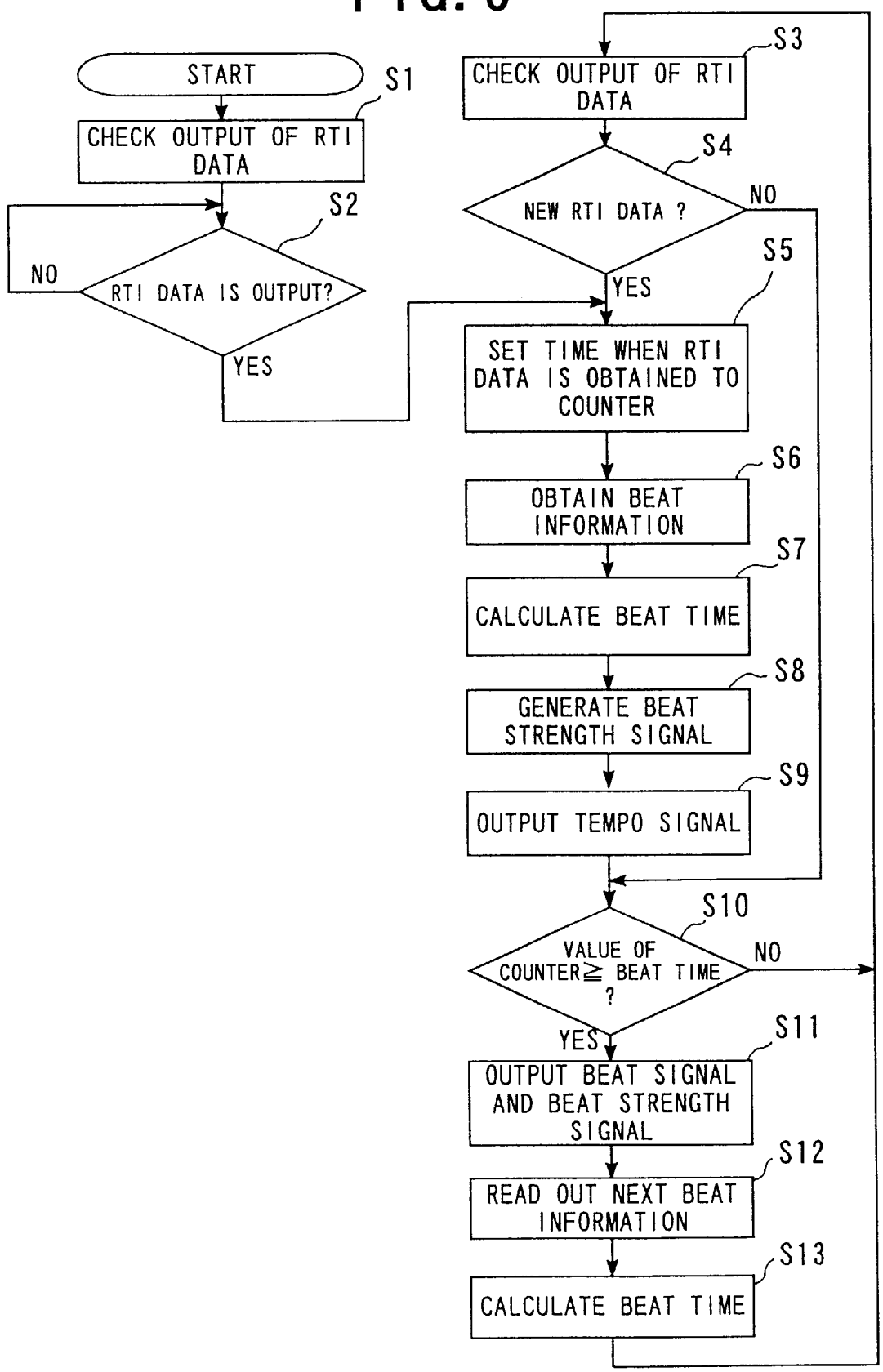
FIG. 6 is a flowchart showing processes in accordance with a beat signal generating program according to the embodiment of the present invention.

When the reproduction of the DVD 200 is started by the DVD reproducing apparatus 1, a beat signal generating process is executed by the system controller 100 according to the beat signal generating program shown in FIG. 6. The beat signal generating process is executed, parallel to this reproduction process.

At steps 1 and 2 in FIG. 6, the system controller 100 determines whether or not the RTI data is output from the RTI decoder 96. If the RTI data is output, the system controller 100 instructs the RTI data to be stored in the memory 100a of the system controller 100, and then executes a step 5. In addition, if the RTI data is not output, the system controller 100 waits for the output of the RTI data at the step 2.

At the step 5, the system controller 100 instructs a time when the RTI data was stored in the memory 100a to be stored in this memory 100a, and also inputs this time to a time counter mounted in the system controller 100. Then, the time counter begins counting the time.

Figure 7:
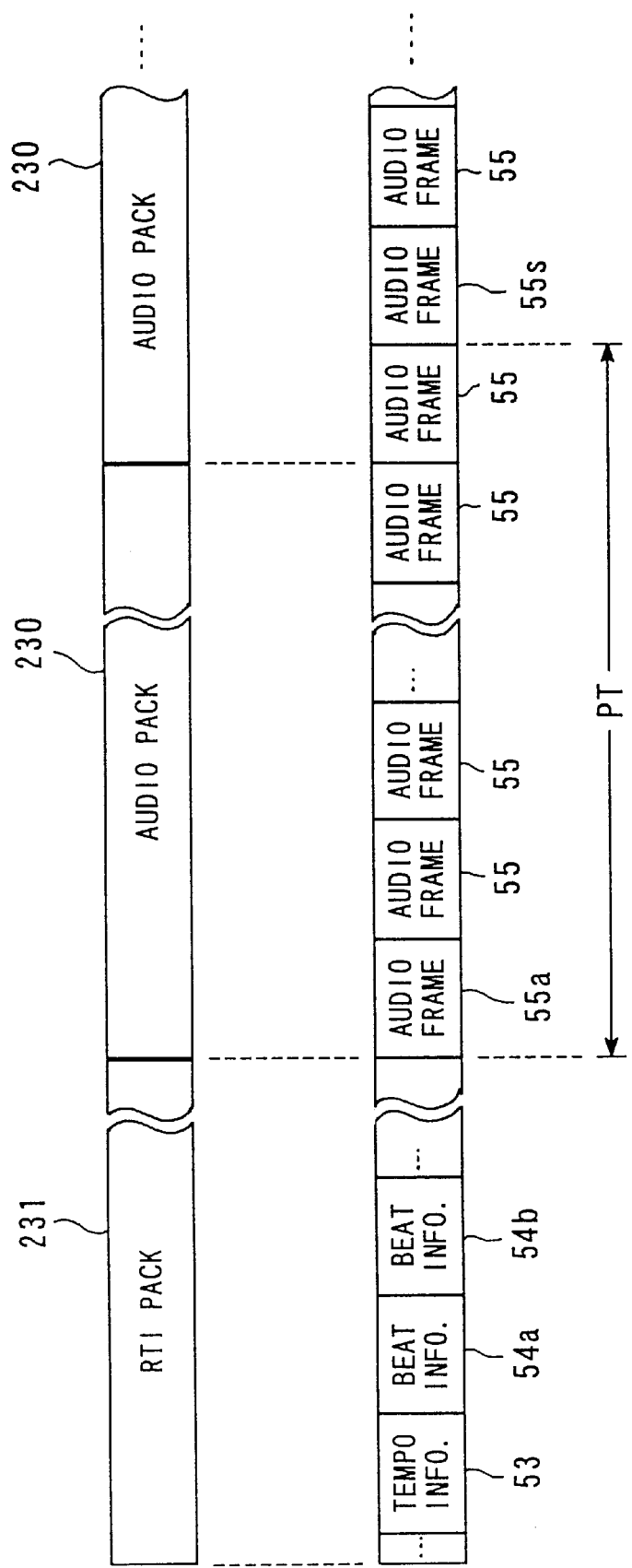
FIG. 7 is a view showing the RTI pack and an audio pack recorded on the DVD according to the embodiment of the present invention.

That is, counting of the time is started when the RTI data is output from the RTI decoder 96. This means that counting of the time is started when reproduction of the first audio frame 55a arranged in the audio pack 230 placed next to the RTI pack 231 is started, because this first audio frame 55a is placed immediately after the RTI data, as shown in FIG. 7, and as a result, the output time of the RTI data is substantially equal to the time when the reproduction of this first audio frame 55a is started.

At a step 6, the system controller 100 obtains one beat information 54 included in the RTI data stored in the memory 100a at the step 2. As shown in FIG. 7, a plurality of beat information 54 are recorded in the RTI data. At this stage, the system controller 100 reads out, from the memory 100a, the beat information 54a positioned at the lead among these beat information 54.

At a step 7, the system controller 100 calculates a time when an audio frame 55s in which the beat of the music is present is reproduced. This calculation is carried out as follows. A frame designation information 61 is included in the beat information 54 obtained the previous step. The system controller 100 firstly read out this frame designation information 61. The frame designation information 61 indicates the address of the audio frame 55s in which the beat of the music is present. As mentioned above, the order of the audio frames 55 arrayed in the audio pack 230 is not changed, so that the reproduction of the audio frames 55 is always done in this order. The period of time necessary for reproducing each audio frame 55 is 1/600 seconds. Based on these conditions, the system controller 100 secondly calculates the time period PT (time length PT) between the time when the first audio frame 55a is reproduced and the time when the audio frame 55s in which the beat of the music is present is reproduced. Next, the system controller 100 adds the calculated time period PT to the time when the RTI data was stored in the memory 100a, thereby obtaining the time when the audio frame 55s in which the beat of the music is present is reproduced. This time is referred to as a "beat time", hereinafter.

Then, at a step 8, the system controller 100 generates a beat strength signal, in accordance with the beat strength information 62 included in the beat information 54 read out from the memory 100a.

Then, at a step 9, the system controller 100 reads out the tempo information 53 included in the RTI data recorded in the memory 100a, and generates a tempo signal in accordance with this tempo information 53. Then, the system controller 100 outputs this tempo signal through the beat signal output portion 86. The tempo signal is, for example, a digital signal of two bytes, for example, representing the tempo of the music.

At a step 10, the system controller 100 determines whether or not a value of the time counter becomes equal to or higher than the beat time calculated at the step 7. If the value of the time counter becomes equal to or higher than the beat time, the system controller 100 continuously executes the step 11. At the step 11, the system controller 100 outputs the beat signal and the beat strength signal to the beat signal output portion 86. The time when the value of the time counter becomes equal to or higher than the beat time is substantially equal to the time when the audio information piece recorded in the audio frame 55s in which the beat of the music is present is reproduced. Thus, the beat signal and the beat-strength signal can be output in coincidence with the beat of the music.

For example, the beat signal is, for example, a pulse signal in which a level is changed at a time point when a beat is present, a timing clock based on an MIDI standard or an MIDI time code based on an MIDI standard. The beat strength signal is, for example, a digital signal of one byte representing a strength of a beat.

At a step 12, the system controller 100 reads out the second beat information 54b (FIG. 7) positioned next to the first beat information 54a from the RTI data stored in the memory 100a.

Then, at a step 13, the system controller 100 calculates the beat time in accordance with the frame designation information 61 included in the second beat information 54b. After that, the system controller 100 executes the step 3.

On the other hand, at the step 10, if the value of the time counter is not equal to or higher than the beat time calculated at the step 7, the audio frame 55s in which the beat of the music is present is not still reproduced. In this case, the system controller 100 does not execute the processes at the steps 11 to 13, and executes the step 3.

Then, at the step 3, the system controller 100 investigates the input RTI data. At the step 4, the system controller 100 determines whether or not a new RTI data is input from the RTI decoder 96 to the system controller 100. If the new RTI data is input to the system controller 100, the system controller 100 stores a content of the RTI data in the memory 100a, and continuously executes the step 5.

Then, the system controller 100 executes the processes at the steps 5 to 13, in accordance with the newly-input RTI data. On the other hand, if the new RTI data is not input to the system controller 100, the system controller 100 executes the step 10. After that, the system controller 100 repeats the steps 10, 3 and 4, until the value of the time counter becomes equal to or higher than the beat time, or until the RTI data is updated at the step 4.

As mentioned the DVD reproducing apparatus 1 according to the embodiment of the present invention can simultaneously execute the process of reproducing the music and the process of outputting the beat signal based on the above-mentioned beat signal generating program. Accordingly, the beat signal and the beat strength signal can be output through the beat signal output portion 86, at the same timing as the beat of the presently-reproduced music.

Figure 8:
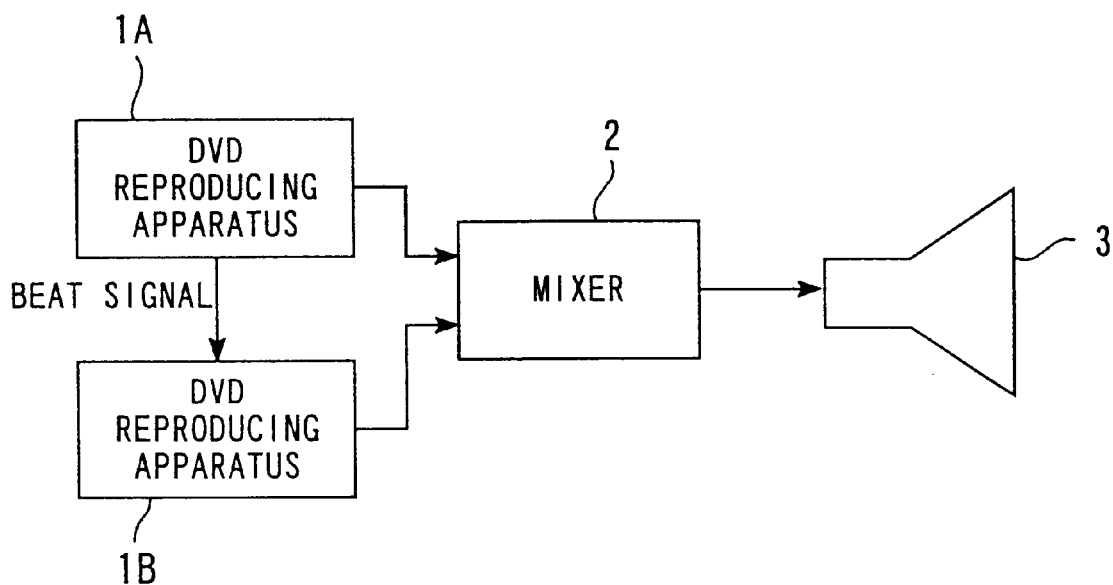
FIG. 8 is a view showing a first utilization example of the DVD reproducing apparatus according to the embodiment of the present invention.

Thus, according to this embodiment, it is possible to connect two DVD reproducing apparatuses 1A, 1B, a mixer 2 and a speaker 3 as shown in FIG. 8 and then output a beat signal and the like from the DVD reproducing apparatus 1A to the DVD reproducing apparatus 1B to thereby match a beat of a music to be reproduced by the DVD reproducing apparatus 1A with a beat of a music to be reproduced by the DVD reproducing apparatus 1B. Accordingly, it is possible to easily achieve the remix/continuous play to be played by the disk jockey (DJ) in the disco and the like.

Figure 9:
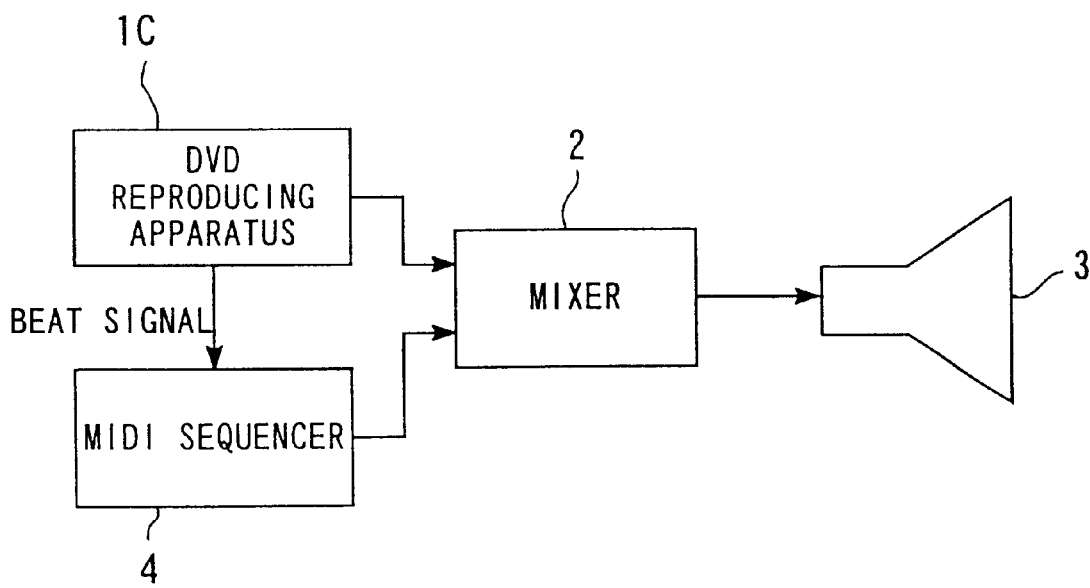
FIG. 9 is a view showing a second utilization example of the DVD reproducing apparatus according to the embodiment of the present invention.

As shown in FIG. 9, if a DVD reproducing apparatus 1C for outputting a timing clock based on the MIDI standard as a beat signal is connected to a built-in tone generator type MIDI sequencer 4 operating synchronously with the timing clock based the MIDI standard, a tone generator of an MIDI sequencer or a built-in MIDI sequencer type and the like can be synchronously played, in accordance with the timing clock output by the DVD reproducing apparatus 1C.

Figure 10:
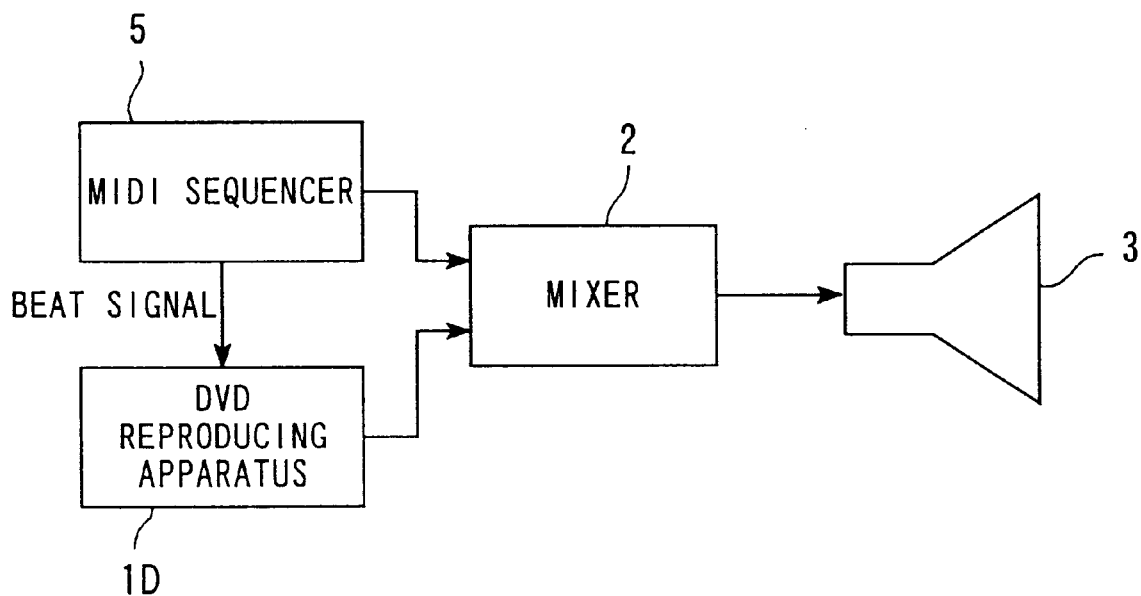
FIG. 10 is a view showing a third utilization example of the DVD reproducing apparatus according to the embodiment of the present invention.

Moreover, as shown in FIG. 10, a music can be reproduced by a DVD reproducing apparatus 1D, in synchronization with a timing clock output by a built-in tone generator type MIDI sequencer 5 and the like.

Figure 11:
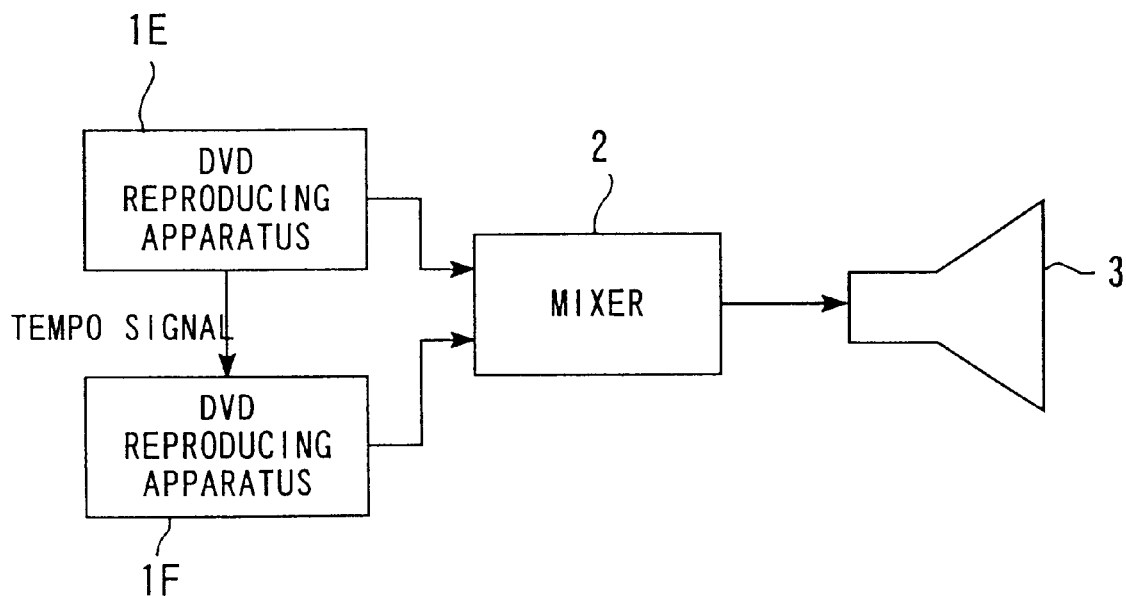
FIG. 11 is a view showing a fourth utilization example of the DVD reproducing apparatus according to the embodiment of the present invention.

Furthermore, as shown in FIG. 11, it is possible to output a tempo signal from a DVD reproducing apparatus 1E to a DVD reproducing apparatus 1F to thereby easily transmit a tempo of a music reproduced by the DVD reproducing apparatus 1E to the DVD reproducing apparatus 1F. This enables the DVD reproducing apparatus 1E and the DVD reproducing apparatus 1F to easily perform the reproductions in synchronization with each other.

In addition, it is described in the embodiment that the address of the audio frame 55b in which the beat of the music is present is recorded in the beat information 54 as the frame designation information 61. However, the present invention is not limited to this case. For example, the time period PT required between the time when the reproduction of the first audio frame 55a in the audio pack 230 positioned next to the RTI pack 231 is started and the time when the reproduction of the audio frame 55s in which the beat of the music is present is started may be calculated in advance, and this calculated time period PT may be recorded as the frame designation information 61.

In this case, the frame designation information 61 of the beat information 54 is read out at the step 7 or 13 in the above-mentioned beat signal generating program to accordingly recognize the time period PT between the time when the reproduction of the first audio frame 55a is started and the time when the reproduction of the audio frame 55s in which the beat of the music is present is started. Then, the time period PT is added to the time when the RTI data was obtained, to thereby calculate the time when the audio frame 55s in which the beat of the music is present is reproduced.

Moreover, the data structures of the RTI pack (beat information piece) and the audio frame (music information piece) recorded on the DVD 200 described as this embodiment are not limited to them. So, another data structure may be employed if it satisfies the configuration described below. That is, it includes music information pieces of fixed lengths which are arrayed continuously in a state adjacent to each other and a beat information piece inserted into an array of the music information pieces. The music information piece includes music information in which a music is divided for each predetermined unit time. The beat information piece includes beat information representing a position of the music information piece which includes music information containing a beat of the music, among the respective music information pieces, with a position into which the beat information piece is inserted as a standard. Here, the relative address is, for example, a value representing the position of the music information piece containing the beat of the music with the position into which the beat information piece is inserted as the standard, or a value representing a time required between a time point when the beat information included in the beat information piece is read out and a time point when the reproduction of the music information piece containing the beat of the music is started.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claim are therefore intended to be embraced therein.

The entire disclosure of Japanese Patent Application No. 10-72794 filed on Mar. 20, 1998 including the specification, claims, drawings and summary is incorporated herein by reference in its entirety.

What is claimed is:

1. An apparatus for reproducing music on the basis of music data which includes music information representing the music to be reproduced and beat information representing a beat of the music and which is recorded on a recording medium, the music information being divided into a plurality of music information pieces whose time lengths are equal to each other, the beat information being divided into a plurality of beat information pieces, each of the beat information pieces including information for designating one of the music information pieces in which the beat of the music is present, the beat information being separately recorded from the music information on the recording medium, the apparatus comprising:

a reading device that reads the music data from the recording medium;

a reproduction device that extracts the music information pieces from the read music data, and tat reproduces the music on the basis of the extracted music information pieces; and a beat signal output device that extracts one of the beat information pieces from the read music data, and that designates one of the music information pieces in which the beat of the music is present, and that outputs a beat signal representing the beat of the music at the same time that the designated one of the music information pieces is reproduced by the reproduction device.

2. The apparatus according to claim 1, wherein the beat signal output device comprises:

an extraction device that extracts one of the beat information pieces from the read music data;

a designation device that designates one of the music information pieces in which the beat of the music is present, on the basis of the extracted one of the beat information pieces;

a calculation device that calculates a time that the designated one of the music information pieces is reproduced;

a counting device that counts a time while the music is reproduced; and an output device that outputs the beat signal when the time counted by the counting device coincides with the time calculated by the calculation device.

3. The apparatus according to claim 2, wherein the calculating device comprises:

a time identifying device that identifies a time that a first music information piece, which is placed at a lead of a row of the music information pieces, is reproduced;

a time length calculation device that calculates a time length between a location of the first music information piece and a location of the designated one of the music information pieces in the row of the music information pieces, by using the time length of each of the music information pieces; and an output time calculation device that calculates an output time of the beat signal by using the time identified by the time identifying device, and the time length calculated by the time length calculation device.

4. The apparatus according to claim 1, wherein the music data includes beat strength information representing a strength of the beat of the music, and the apparatus further comprises a beat strength signal output device that outputs a beat strength signal representing the strength of the beat of the music on the basis of the beat strength information included in the read music data.

5. The apparatus according to claim 1, wherein the music data includes tempo information representing a tempo of the music, and the apparatus further comprises a tempo signal output device that outputs a tempo signal representing the tempo of the music on the basis of the tempo information included in the read music data.

6. The apparatus according to claim 1, wherein the beat signal output device outputs a timing clock standardized by a MIDI (Music Instrument Digital Interface) standard as the beat signal.

7. The apparatus according to claim 1, wherein each of the music information pieces is a frame standardized by a DVD standard.

8. The apparatus according to claim 1, wherein the beat information pieces are included in one pack standardized by a DVD standard.

9. The apparatus according to claim 4, wherein the beat information pieces and the beat strength information are included in one pack standardized by a DVD standard.

10. The apparatus according to claim 5, wherein the beat information pieces and the tempo information are included in one pack standardized by a DVD standard.

11. A storage medium readable by an apparatus for reproducing music, the storage medium having a data structure which enables the apparatus to reproduce the music, the data structure comprising:

a first group that includes music information representing music to be reproduced, the music information being divided into a plurality of music information pieces whose time lengths are equal to each other; and a second group that includes beat information representing a beat of the music, the beat information being divided into a plurality of beat information pieces, each of the beat information pieces including information for designating one of the music information pieces in which a beat of the music is present, wherein the beat information is separately recorded from the music information on the storage medium.

12. The storage medium according to claim 11, wherein the music information pieces are arrayed in a row within the first group, and one of the beat information pieces represents a time length between a location of a lead of the row of the music information pieces and a location of one of the music information pieces in which the beat of the music is present, within the first group.

13. The storage medium according to claim 11, wherein the second group includes beat strength information representing a strength of the beat of the music.

14. The storage medium according to claim 11, wherein the second group includes tempo information representing a tempo of the music.

15. The storage medium according to claim 11, wherein the first group is a pack standardized by a DVD standard, and each of the music information pieces is a frame standardized by a DVD standard.

16. The storage medium according to claim 11, wherein the second group is a pack to which a pack standardized by a DVD standard is applied.

17. A method for reproducing music on the basis of music data which includes music information representing the music to be reproduced and beat information representing a beat of the music and which is recorded on a recording medium, the music information being divided into a plurality of music information pieces whose time lengths are equal to each other, the beat information being divided into a plurality of beat information pieces, each of the beat information pieces including information for designating one of the music information pieces in which the beat of the music is present, the beat information being separately recorded from the music information on the recording medium, the method comprising the processes of:

reading the music data from the recording medium;

extracting the music information pieces from the read music data, and reproducing the music on the basis of the extracted music information pieces;

extracting one of the beat information pieces from the read music data;

designating one of the music information pieces in which the beat of the music is present; and outputting a beat signal representing the beat of the music at the same time that the designated one of the music information pieces is reproduced.

18. The method according to claim 17, further comprising the processes of:

calculating a time that the designated one of the music information pieces is reproduced; and counting a time while the music is reproduced, wherein said process of designating one of the music information pieces designates one of the music information pieces in which the beat of the music is present, on the basis of the extracted one of the beat information pieces, and wherein said process of outputting a beat signal outputs the beat signal when the time counted by the counting device coincides with the time calculated.

19. The method according to claim 18, wherein the process of calculating a time comprises the processes of:

identifying a time that a first music information piece, which is placed at a lead of a row of the music information pieces, is reproduced;

calculating a time length between a location of the first music information piece and a location of the designated one of the music information pieces in the row of the music information pieces, by using the time length of each of the music information pieces; and calculating an output time of the beat signal by using the time identified by the time identifying device, and the time length calculated.

20. The method according to claim 17, wherein the music data includes beat strength information representing a strength of the beat of the music, and the method further comprises a process of outputting a beat strength signal representing the strength of the beat of the music on the basis of the beat strength information included in the read music data.

21. The method according to claim 17, wherein the music data includes tempo information representing a tempo of the music, and the method further comprises a process of outputting a tempo signal representing the tempo of the music on the basis of the tempo information included in the read music data.

22. The method according to claim 17, wherein said process of outputting a beat signal comprises outputting a timing clock standardized by a MIDI (Music Instrument Digital Interface) standard as the beat signal.

23. The method according to claim 17, wherein each of the music information pieces is a frame standardized by a DVD standard.

24. The method according to claim 17, wherein the beat information pieces are included in one pack standardized by a DVD standard.

25. The method according to claim 20, wherein the beat information pieces and the beat strength information are included in one pack standardized by a DVD standard.

26. The method according to claim 21, wherein the beat information pieces and the tempo information are included in one pack standardized by a DVD standard.

* * * * *